United States Patent [19]

Arino et al.

[11] Patent Number: 4,492,249

[45] Date of Patent: Jan. 8, 1985

[54] MOUNTED CHECK VALVE ASSEMBLY

[75] Inventors: Masao Arino, Higashimatsuyama; Teruo Koyama, Okazaki, both of Japan

[73] Assignee: Jidosha Kiki Co., Ltd., Japan

[21] Appl. No.: 379,318

[22] Filed: May 18, 1982

[30] Foreign Application Priority Data

Jun. 3, 1981 [JP] Japan .............................. 56-81874[U]

[51] Int. Cl.³ ............................................. F16K 15/00
[52] U.S. Cl. .................................. 137/515; 137/454.2; 137/799; 251/150
[58] Field of Search ................... 137/454.2, 454.4, 515, 137/515.5, 799; 251/150; 285/242, 244, 252; 417/478

[56] References Cited

U.S. PATENT DOCUMENTS

| 723,042 | 3/1903 | Schwerin | 417/478 |
| 1,364,147 | 1/1921 | Spahr | 137/454.2 |
| 1,375,362 | 4/1921 | Carey | 137/454.2 |
| 2,684,080 | 7/1954 | Crowell | 137/515.5 |
| 4,295,412 | 10/1981 | Hachiro | 137/454.2 X |

FOREIGN PATENT DOCUMENTS

| 1600685 | 1/1970 | Fed. Rep. of Germany | 137/479 |
| 2111326 | 4/1978 | Fed. Rep. of Germany | 137/493.8 |
| 1561514 | 2/1980 | United Kingdom | 137/515.5 |

Primary Examiner—Robert G. Nilson
Attorney, Agent, or Firm—McGlew and Tuttle

[57] ABSTRACT

A mounted check valve assembly to be installed between two fluid vessels comprises a check valve having a cylindrical body annularly bulged midway, a pipe securely fixed at one end to one of the vessels and engaged at the other end with one end of the check valve, and a hose connected at one end to the other vessel and fitted at the other end over the check valve and farther over the end portion of the pipe to support the same.

4 Claims, 1 Drawing Figure

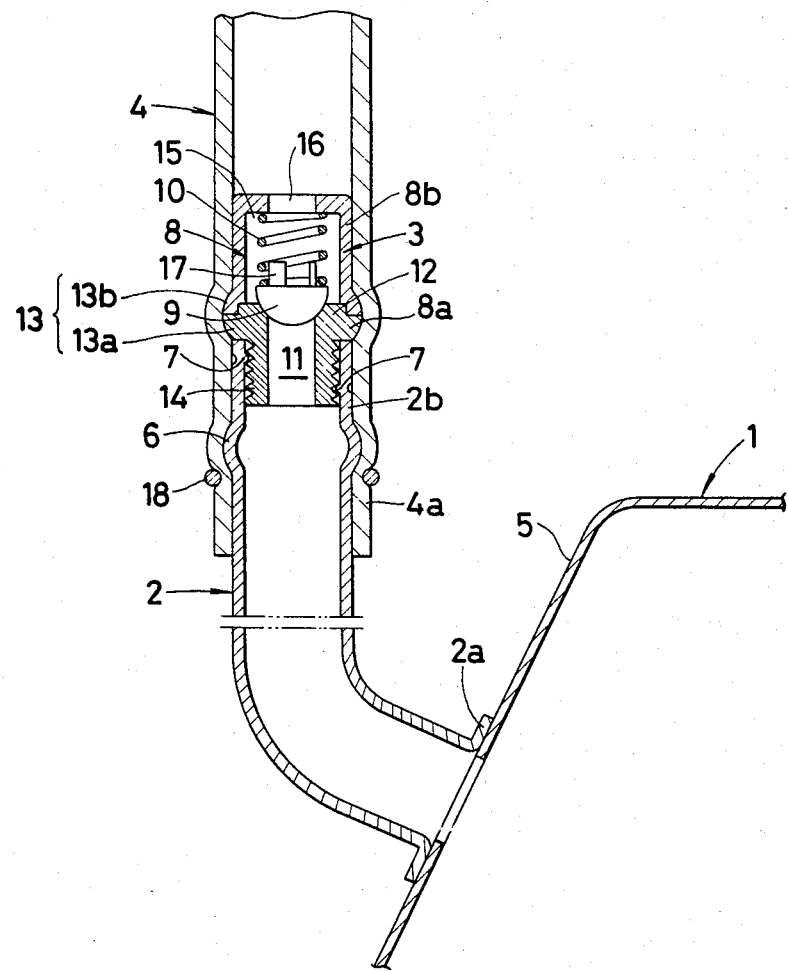

MOUNTED CHECK VALVE ASSEMBLY

FIELD AND BACKGROUND OF THE INVENTION

This invention relates to a mounted check valve assembly, and more specifically to an assembly of a check valve mounted in a hose.

Between vessels holding or handling fluids, for example, between the brake booster and the intake manifold of automobiles, check valves are installed in varied modes. In one (first) mode, one end of the check valve is fixed to the brake booster and the other end is inserted in, and supported by, a vacuum hose connected to the intake manifold. In another (second) mode, both the ends of the check valve are respectively inserted in, and supported by, vacuum hoses connected to the brake booster and the intake manifold. In still another (third) mode, the check valve is fitted and supported in a single vacuum hose extending between the two vessels.

In the first mode, the check valve requires much labor in installing since it must be solidly secured to the brake booster. The valve is not easy to replace, and adequate care must be used to ensure a gastight or leakproof joint between the brake booster and the check valve and between the vacuum hose and the valve. The second mode requires the ends of both the vacuum hoses to be securely clamped, respectively, to the opposite ends of the check valve to provide perfectly leakproof connections. The third mode eliminates the need for taking gastight seal into consideration, but the complete insertion of the check valve into the hose and subsequent replacement of the inserted valve, where necessary, entail no slight labor. Moreover, the last-mentioned mode, in which the check valve is hidden in the hose, is inferior to the other modes in accessibility for visual inspection.

SUMMARY OF THE INVENTION

It is a principal object of the present invention to provide a mounted check valve assembly which circumvents the aforementioned difficulties involved in the conventional modes of check valve installation.

The object is realized, in accordance with the invention, by a check valve assembly characterized in that an annular bulge is formed on a cylindrical valve body, one end of the valve is engaged with a pipe the other end of which is securely attached to a fluid vessel, and one end of a hose is fitted over the check valve and farther over the end portion of the pipe to support the same.

The above and other objects, features, and advantages of the invention will become more obvious from the following detailed description taken in connection with the accompanying drawing.

BRIEF DESCRIPTION OF THE DRAWING

The single FIGURE is a vertical sectional view of a mounted check valve assembly embodying the invention.

DESCRIPTION OF THE PREFERRED EMBODIMENT

Referring to the drawing, the embodiment of the invention is shown comprising a pipe 2 attached at one end to a fluid vessel, e.g., a brake booster 1, a check valve 3, and a hose 4 connected at one end to another fluid vessel, e.g., an intake manifold (not shown). The pipe 2 is fixed at the one end 2a to the shell 5 of the brake booster 1 by welding or by bolts or other fastener means. The pipe is formed with an annular bulge 6 near the opposite end 2b, and has an internal projection 7 formed over a suitable length of the pipe end portion.

The check valve 3 comprises a cylindrical body 8 consisting of two half members 8a, 8b of plastics, a closure member 9 movably fitted in the body, and a spring 10. The half body member 8a has an axial hole acting as a passage 11 and is formed at one end with a valve seat 12 adapted to receive and engage the closure member 9. The member 8a also has an annular flange 13a of a semiarcuate contour formed adjacent the valve seat 12 and is externally threaded at 14 on the portion opposite to the seat. The other half body member 8b is cylindrically shaped with a hollow 15, and an end wall of the cylinder has a center opening 16 acting as a passage. On the opposite end which is open, the member 8b has an annular flange 13b of a semi-arcuate contour. These half body members 8a, 8b are joined together, with their annular flanges 13a, 13b combined to form an annular bulge 13 of an arcuate cross section. The closure member 9 has legs or upright protuberances 17, around which a coiled spring 10 is fitted inside the hollow 15 to keep the closure member 9 elastically in contact with the seat 12.

In assembling, one end of the check valve 3 is first inserted into one end 2b of the pipe 2, with its external thread 14 in engagement with the internal projection 7. Next, the check valve 3 is inserted, from the other end onward, deep into the end portion 4a of the hose the opposite end of which is communicated with, and supported by, an intake manifold (not shown), until the hose end portion 4a covers the pipe end portion 2b including its annular bulge 6. The hose 4 is securely fastened to the pipe by a clamp 18 at a point just beyond the annular bulge 6.

In the assembly wherein the check valve has thus been mounted in place, a gastight seal is established between the check valve 3 and the hose 4 at the connection by the annular bulge 13 of the check valve 3, and also between the pipe 2 and the hose 4 at the connection by the annular bulge 6 of the pipe 2 and by the clamp 18.

As described above, the mounted check valve assembly according to this invention is advantageous in that the check valve is easy to install and replace, a leakproof connection is easily attained because the check valve is held completely within the hose, and the number of clamping points is reduced to a minimum.

We claim:

1. In a combination with a brake booster having a shell with an opening therein, a mounted check valve assembly comprising, a check valve having a cylindrical body defining an interior passage with a valve seat, a closure member movable in said passage against said seat to close said check valve, biasing means in said passage engaged with said closure member for biasing said closure member against said seat, said cylindrical body having an outer surface with an annular bulge defined around said cylindrical body intermediate a length of said cylindrical body, a pipe securely connected to said shell and around said opening, said pipe having an end portion spaced from said shell, said end portion having an interior with an internal projection extending in said interior, said cylindrical body of said check valve on one side of said annular bulge being threaded and being threadably engaged in said end portion of said pipe and with said internal projection, and a hose having an end portion extending over a full length of said cylindrical body and onto said end portion of said pipe, said pipe having another annular bulge formed in the end portion to be covered by said end portion of said hose, said annular bulge being circular, said cylindrical body of said check valve comprising a first part carrying said thread and one half of said circular annular bulge in a second part having a cylindrical outer surface and carrying a second half of said circular bulge, said first part defining said valve seat and said second part defining a portion of said passage containing said closure member and said biasing means.

2. A mounted check valve combination according to claim 1 including a clamp engaged around said hose on a side of said other annular bulge of said end portion spaced away from said check valve.

3. A mounted check valve combination according to claim 2, wherein an outer diameter of said first part adjacent said annular bulge is smaller than an outer diameter of said second part away from said annular bulge.

4. A mounted check valve combination according to claim 3, wherein an inner diameter of said first part defining a portion of said passage is smaller than an inner diameter of said second part defining another portion of said passage.

* * * * *